3,461,155
BIS(ω-SUBSTITUTED PERFLUOROACYL)
PEROXIDES
David E. Rice, Minneapolis, Minn., assignor to Minnesota
Mining and Manufacturing Company, St. Paul, Minn.,
a corporation of Delaware
No Drawing. Filed Jan. 18, 1965, Ser. No. 426,395
Int. Cl. C07c 73/02
U.S. Cl. 260—479                           15 Claims

ABSTRACT OF THE DISCLOSURE

Bis-(ω-carboxyl ester perfluoroacyl) peroxides are provided as well as substituted perfluoroacyl chloride intermediates of the formula

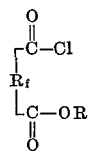

which are converted to said bis-peroxides by reaction with metal peroxides. The substituted perfluoro acyl chlorides in turn are prepared by reacting perfluorinated diacid chlorides with water or an alcohol.

---

This invention relates to new and useful bis-(ω-carboxyl ester perfluoroacyl) peroxides, to certain intermediate compounds useful in the preparation thereof, and to methods for making the same.

More specifically, this invention is directed to compounds of the formula (1) $$RO\overset{O}{\overset{\|}{C}}(R_f)\overset{O}{\overset{\|}{C}}OO\overset{O}{\overset{\|}{C}}(R_f)\overset{O}{\overset{\|}{C}}OR$$

wherein $R_f$ is a perfluoroalkylene group containing from 1 through 15 carbon atoms, and R is hydrogen; or an organic radical such as an α,α-dihydroalkyl radical containing not more than 20 carbon atoms and not more than 14 hydrogen atoms, the only other substituents in said alkyl radical being fluorine, or an aryl radical containing from 6 through 12 carbon atoms and which may be substituted with fluorine.

Preferred compounds of Formula 1 are those wherein the perfluoroalkylene groups are characterized by the formula $-(CF_2)_n-$, $n$ being a positive whole number from 2 through 10 and R is an organic radical as indicated. Most preferably R is hydrogen, a lower alkyl radical, or a lower α,α-dihydroperfluoroalkyl radical. "Lower" as used in this context has reference to less than 6 carbon atoms.

An object of this invention is to provide a new and useful class of bis-(ω-carboxyl ester perfluoroacyl) peroxides.

Another object of this invention is to provide new and useful intermediate compounds useful in the manufacture of such peroxides.

Another object of this invention is to provide methods for the preparation of such new compounds.

Another object is to teach those of ordinary skill in the art how to use such new compounds.

Other and further objects of this invention will be apparent to those skilled in the art from a reading of the present specification and appended claims.

The products and processes of this invention are summarized by the following equations:

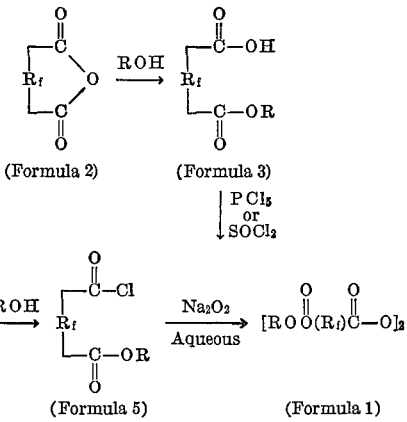

In these equations, $R_f$ and R have their above indicated meanings in reference to Formula 1 definitions, unless otherwise indicated below.

The omega carboxyl ester substituted perfluoroacyl chloride of Formula 5 can be prepared from the corresponding perfluorinated cyclic anhydride of Formula 2 as shown by the above equations. In this synthesis, $R_f$ is a defined above in reference to Formula 1, and R is an organic radical such as an α,α-dihydroalkyl radical containing not more than 20 carbon atoms and not more than 14 hydrogen atoms, the only other substituents in said alkyl radical being fluorine; or an aryl radical containing from 6 through 12 carbon atoms and which may be substituted with fluorine. This esterification reaction is generally carried out at temperatures in the range of from about —20° C. to reflux temperatures under liquid phase conditions at atmospheric pressures. Equivalent weights of reactions are usually employed in order to maximize the yield of desired product. While it is generally preferred to add the alcohol to the anhydride (both are generally liquids at room temperature), it will be appreciated that inert liquid solvents can be employed as a reaction medium if desired.

The product of this esterification reaction, the ester acid of Formula 3 above, is generally a liquid. After removal of any excess alcohol, this ester acid is then contacted with a chlorinating agent such as phosphorus pentachloride or thionyl chloride. It is preferred to employ an excess of phosphorus pentachloride or at least stoichiometric amounts so as to obtain maximum yields of the desired acyl chloride product of Formula 5. Usually it its not necessary to use temperatures greater than about 20° C. with phosphorus pentachloride but with thionyl chloride the resulting mixture is conveniently heated to reflux temperatures. This chlorination reaction is allowed to continue until liberation of HCl is essentially complete. The product is conveniently separated by distillation and yields are essentially quantitative. This route to Formula 5 compounds appears to be most satisfactory when the number of carbon atoms in the cyclic anhydride ring of Formula 2 is 4, 5 or 6.

The perfluoroacyl chloride of Formula 5 can also be made for the corresponding perfluorinated diacid chloride (i.e. Formula 4 compounds) by reacting such starting materials with a compound of the Formula ROH where R is hydrogen or preferably an organic radical as indicated above.

In Formula 4 compounds, $R_f$ and R are as defined above in reference to Formula 1. The diacid chloride is reacted with one equivalent weight of alcohol. Liquid phase conditions are employed. A non-reactive solvent may be employed. The temperature of reaction will vary greatly depending upon the particular type of alcohol employed. Commonly, the temperature will range from —15 to 100° C. though temperatures below or higher than this can be employed conveniently depending upon the reactants and reaction conditions to be employed. The product is separated from unreacted diacid chloride and diester by distillation. Commonly yields are approximately 50 percent based on the diacid chloride charged.

The 1,1-dihydroperfluoroalkyl esters are prepared conveniently by using as the ROH compound in Equations 2 and 3 a 1,1-dihydroperfluoroalkanol prepared by the methods described in U.S. Patent No. 2,666,797 or in the Journal of the American Chemical Society, 72, 5071 (1950).

The compounds of Formula 5 are readily reacted with an alkali metal or alkaline earth peroxide to produce the bis-(ω-carboxyl-ester perfluoroacyl) peroxides of Formula 1. If a liquid fluorocarbon is admixed with the aqueous sodium peroxide, the bis(ω-carboxyl ester perfluoroacyl) peroxides will dissolve in the fluorocarbon. If the fluorocarbon is not present, the Formula 1 compounds tend to precipitate as crystals. Since Formula 1 compounds are heat sensitive, they should be stored at temperatures below 0° C. and preferably below —20° C. A preferred method for isolating Formula 1 compounds is by crystallization from a liquid fluorocarbon at a low temperature, say, about —65° C.

The Formula 1 compounds are useful as catalysts for the preparation of copolymers of vinylidene fluoride and perfluoropropene. These copolymers are useful as high temperature sealants. The Formula 1 compounds are also useful as chemical intermediates for the manufacture of various known compounds.

Formula 5 compounds where $R_f$ is a perfluoroalkylene group containing from 1 through 15 carbon atoms, and R is selected from the group consisting of hydrogen, methyl, α,α-dihydrotrifluoroethyl and an aryl radical containing from 6 through 12 carbon atoms which may be substituted with fluorine, are particularly useful intermediates for the manufacture of the peroxides of Formula 1.

The following examples are offered as a better understanding of the present invention and should not be construed as limiting thereto.

EXAMPLE 1

Perfluoroglutaric anhydride (56.6 grams) is charged into a flask fitted with a reflux condenser, addition funnel, and stirrer, and then the so-charged flask is cooled to —30° C. Anhydrous methanol (10.2 cubic centimeters) is then added dropwise at a rate such that the reaction temperature does not exceed —20° C. Distillation of the reaction mixture gives 57.5 grams $CH_3O_2C(CF_2)_3COOH$, boiling point 88–94° C. at 1 mm. Hg. identified by its infrared spectrum and neutralization equivalent. This material is then added dropwise to phosphorous pentachloride (47.5 grams) and the mixture stirred for one hour at room temperature. Distillation yields 47.4 grams $$CH_3O_2C(CF_2)_3COCl$$

boiling point 42–44° C. at 15 mm. Hg, $n_D^{26}$ (refractive index) 1.3515, identified by its infrared and nuclear magnetic resonance spectra, and neutralization equivalent.

EXAMPLE 2

A 500 cubic centimeter flask fitted with a condenser, stirrer, addition funnel and thermometer is charged with 138.5 grams (0.50 mole) of perfluoroglutaryl chloride and then the so-charged flask is cooled to —15° C. To this is added dropwise 16 grams (0.50 mole) of methyl alcohol while keeping the reaction mixture at —10 to —15° C. After the addition is complete the reaction mixture is stirred for another 30 minutes and then distilled. A yield of 57.5 grams of

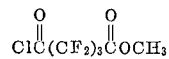

which has a boiling point of 64–68° C. at a pressure of 34 mm. Hg and having a $n_D^{20}$ (refractive index) of 1.3519 is obtained and is further identified by its infrared spectrum and neutralization equivalent. In addition there is obtained 41.8 grams of unreacted perfluoroglutaryl chloride and 34.1 grams of dimethyl perfluoroglutarate.

EXAMPLE 3

A 250 cubic centimeter 3-neck flask, fitted with a stirrer, thermometer and addition tube is charged with a solvent comprising a mixture of perfluorinated cyclic ethers each molecule of which contains eight carbon atoms (available from the 3M Company under the designation FC–75) (100 cubic centimeters) and the contents cooled to —4° C. A solution consisting of water (10 cubic centimeters), sodium hydroxide (1.2 grams) and 30 percent hydrogen peroxide (4.5 cubic centimeters) is then added and the temperature again adjusted to —4° C. With vigorous stirring, $CH_3O_2C(CF_2)_3COCl$ (4.7 grams) is added all at once resulting in a rapid temperature rise to 6° C. After two minutes reaction time, the mixture is allowed to stratify and 90 cubic centimeters of the fluorocarbon layer withdrawn and cooled to —78° C. The concentration of $[CH_3{-}OOC(CF_2)_3COO]_2$ in this solution is found to be $4.4 \times 10^{-5}$ moles/cubic centimeter by titration according to the method of Silbert and Swern (Analytical Chemistry, 30, 385 (1958)).

A 60 cubic centimeter Pyrex ampoule is charged with 30 cubic centimeters of the above peroxide solution, 35 grams perfluoropropene and 1.4 grams vinylidene fluoride. After sealing, the ampoule is warmed to 20° C., shaken briefly in order to obtain a homogeneous solution and then allowed to stand at room temperature for 16 hours. After venting the unreacted perfluoropropene, the polymer is dried under vacuum at 70° C. The product is a sticky gum (5.9 grams) which has an inherent viscosity of 0.070. The presence of fluorocarbon acid ester groups can be detected by infrared and nuclear magnetic resonance analysis.

EXAMPLE 4

$ClOC(CF_2)_3COCl$ (75 grams) and phenol (25.5 grams) are refluxed together for 4 hours and the mixture distilled at reduced pressure to give $ClOC(CF_2)_3COOC_6H_5$, boiling point 58–64° C. at 0.3 mm. Hg pressure, neutralization equivalent is 108 (theoretical neutralization equivalent is 111). Instead of phenol, pentafluoro phenol may be used.

EXAMPLE 5

Perfluorosuccinic anhydride (25 grams) is cooled to —10° C. and 4.7 grams anhydrous methanol added slowly, with stirring, maintaining a temperature below 0° C. The mixture is stirred for an hour after the methanol addition is complete and then 40 grams of thionyl chloride is added and the mixture refluxed for 6 hours. Distillation yields approximately 15 grams $CH_3OOC(CF_2)_2COCl$, boiling point 109–113° C.

EXAMPLE 6

Perfluorosebacic acid (30 grams) is mixed with phosphorus pentachloride (25.3 grams) and the mixture kept at 100° C. with stirring for 3 hours. Phosphorous oxychloride is removed from this mixture by vacuum distillation (50° C. at .1 millimeter) leaving crude perfluorosebacyl chloride. Trifluoroethanol (9.2 grams) is then added and the mixture heated at 100° C. for 16 hours giving a product consisting of essentially equimolar amounts of $CF_3CH_2O_2C(CF_2)_8COCl$ and $$CF_3CH_2O_2C(CF_2)_8CO_2CH_2CF_3$$

with small amounts of unreacted $ClOC(CF_2)_8COCl$.

EXAMPLE 7

Perfluoroglutaryl chloride (554 grams) and trifluoroethanol (200 grams) are charged into a flask fitted with a reflux condenser and thermometer and heated to reflux. Refluxing is continued for 16 hours. Distillation of the reaction mixture gives 312 grams of $$CF_3CH_2O\overset{O}{\underset{\|}{C}}(CF_2)_3\overset{O}{\underset{\|}{C}}Cl$$

boiling point 75–79° C. at 50 mm. Hg, $n_D^{26}$ (refractive index) of 1.3328, identified by its infrared spectrum and neutralization equivalent.

EXAMPLE 8

Beta-pentafluoroethyl perfluoroadipic anhydride (51.5 grams)

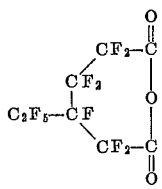

is cooled to −10° C. and anhydrous methanol (4.44 grams) is slowly added, maintaining a temperature below 20° C. To the product, which is a viscous liquid, is added $PCl_5$ (26 grams) and the mixture is then stirred for two hours at room temperature. Distillation of the mixture at reduced pressure gives a forecut of $POCl_3$ followed by approximately 40 grams of $$CH_3O_2CCF_2CFCF_2CF_2COCl$$
$$\underset{C_2F_5}{|}$$

This product has a boiling point of 50–54° C. at 1.5 mm. Hg pressure. This product is identified by its infrared spectrum and neutralization equivalent.

EXAMPLE 9

Perfluoroglutaryl chloride (50 grams) is heated to 50° C. and water (3.25 grams) is added slowly with stirring. Rapid distillation of the mixture at reduced pressure yields about 10 grams of $HOOC(CF_2)_3COCl$. This product has a boiling point of 50–51° C. at 1.5 mm. Hg pressure. This product is identified by its infrared spectrum and by its neutralization equivalent of 86.9 (theoretical neutralization equivalent is 86.2).

The claims are:
1. Compounds of the formula

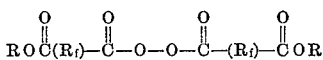

wherein $R_f$ is a perfluoroalkylene group containing from 1 through 15 carbon atoms, and R is selected from the group consisting of hydrogen, a lower alkyl radical, an aryl radical containing from 6 to 12 carbon atoms which may be substituted with fluorine, and a α,α-dihydroalkyl radical containing not more than 20 carbon atoms and not more than 14 hydrogen atoms, the only substituents in said alkyl radical being fluorine.

2. Compounds of the formula

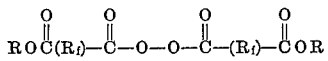

wherein $R_f$ is a perfluoroalkylene group containing from 1 through 8 carbon atoms, and R is selected from the group consisting of hydrogen, a lower alkyl radical, an aryl having 6 carbon atoms which may be substituted with fluorine and a lower α,α-dihydroperfluoroalkyl radical.

3. Compounds of claim 1 wherein R is hydrogen.
4. Compounds of claim 1 wherein R is an α,α-dihydroalkyl radical containing not more than 20 carbon atoms and not more than 14 hydrogen atoms, the only other substituents in said alkyl radical being fluorine.
5. Compounds of claim 4 wherein R is 1,1-dihydrotrifluoroethyl.
6. Compounds of claim 4 wherein R is a lower alkyl radical.
7. Compounds of claim 4 wherein R is methyl.
8. Compounds of claim 1 wherein R is an aryl radical containing from 6 through 12 carbon atoms and which may be substituted with fluorine.
9. Compounds of claim 8 wherein R is phenyl.
10. Compounds of the formula

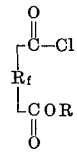

wherein $R_f$ is a perfluoroalkylene group containing from 1 through 15 carbon atoms, and R is selected from the group consisting of hydrogen, methyl, α,α-dihydrotrifluoroethyl, and an aryl radical containing from 6 through 12 carbon atoms and which may be substituted with fluorine.

11. Compounds of the formula

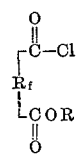

wherein $R_f$ is a perfluoroalkylene group containing from 1 through 8 carbon atoms, and R is selected from the group consisting of hydrogen, a lower alkyl radical, an aryl radical having 6 carbon atoms which may be substituted with fluorine and a lower α,α-dihydroperfluoroalkyl radical.

12. Compounds of claim 10 wherein R is hydrogen.
13. Compounds of claim 10 wherein R is phenyl.
14. Compounds of claim 10 wherein R is methyl.
15. Compounds of claim 10 wherein R is α,α-dihydrotrifluoroethyl.

References Cited

UNITED STATES PATENTS

| | | | |
|---|---|---|---|
| 2,502,478 | 4/1950 | Padbury et al. | 260—537 |
| 2,659,716 | 11/1953 | Park | 260—610 |
| 2,775,618 | 12/1956 | Dittman et al. | 260—610 |
| 3,062,879 | 11/1962 | Drysdale | 260—485 |
| 3,223,725 | 12/1965 | Hill | 260—485 |

OTHER REFERENCES

Morrison et al., "Organic Chemistry," Allyn & Bacon Inc., Boston (1959), p. 474.

LORRAINE A. WEINBERGER, Primary Examiner

M. G. BERGER, Assistant Examiner

U.S. Cl. X.R.

260—87, 485, 537, 539

PO-1050
(5/69)

UNITED STATES PATENT OFFICE
CERTIFICATE OF CORRECTION

Patent No. 3,461,155          Dated August 12, 1969

Inventor(s)   David E. Rice

It is certified that error appears in the above-identified patent and that said Letters Patent are hereby corrected as shown below:

Column 2, line 16, that portion of formula 1 reading "[ROO$\overset{O}{\overset{\|}{}}$" should read -- [RO$\overset{O}{\overset{\|}{}}$C --. Column 2, line 29 "a defined" should read -- as defined --. Column 2, line 39, "reactions" should read -- reactants --. Column 2, line 64, "made for" should -- made from --.

SIGNED AND
SEALED

DEC 2 - 1969

(SEAL)
Attest:

Edward M. Fletcher, Jr.
Attesting Officer

WILLIAM E. SCHUYLER
Commissioner of Pat